United States Patent
Orupold

(10) Patent No.: US 9,283,569 B2
(45) Date of Patent: Mar. 15, 2016

(54) DE-AERATION DEVICE

(75) Inventor: Taavi Orupold, Woolloongabba (AU)

(73) Assignee: FLSMIDTH A/S (DK)

( * ) Notice: Subject to any disclaimer, the term of this patent is extended or adjusted under 35 U.S.C. 154(b) by 0 days.

(21) Appl. No.: 14/241,603

(22) PCT Filed: Aug. 29, 2012

(86) PCT No.: PCT/AU2012/001011
§ 371 (c)(1),
(2), (4) Date: Feb. 27, 2014

(87) PCT Pub. No.: WO2013/029098
PCT Pub. Date: Mar. 7, 2013

(65) Prior Publication Data
US 2014/0216986 A1 Aug. 7, 2014

(30) Foreign Application Priority Data
Aug. 29, 2011 (AU) .................... 2011903462

(51) Int. Cl.
B03D 1/00 (2006.01)
B03B 1/00 (2006.01)
B01D 19/00 (2006.01)

(52) U.S. Cl.
CPC .............. B03B 1/00 (2013.01); B01D 19/0042 (2013.01)

(58) Field of Classification Search
CPC .................. B01D 19/0042; B03B 1/00–13/06
USPC .......... 96/155–220; 209/3.1; 241/24.1–24.31; 95/241–266
See application file for complete search history.

(56) References Cited

U.S. PATENT DOCUMENTS

| 3,006,561 | A | * | 10/1961 | Eberl et al. .................. 241/29 |
| 4,214,879 | A | * | 7/1980 | Whetstone et al. ............. 96/196 |
| 4,816,142 | A | | 3/1989 | Odor et al. |
| 4,921,400 | A | * | 5/1990 | Niskanen ................... 415/169.1 |
| 2004/0011201 | A1 | * | 1/2004 | Stevens .................. C10G 1/045 95/262 |
| 2007/0214964 | A1 | | 9/2007 | Miyashita et al. |
| 2010/0219105 | A1 | * | 9/2010 | White ..................... C10G 1/04 208/391 |

FOREIGN PATENT DOCUMENTS

| EP | 0020023 A1 | 12/1980 |
| EP | 1208897 A1 | 5/2002 |
| WO | 2011081594 A1 | 7/2011 |

OTHER PUBLICATIONS

The International Search Report dated Nov. 19, 2012, 5 pages.
The Written Opinion dated Nov. 19, 2012, 6 pages.

* cited by examiner

*Primary Examiner* — Thomas Bennett McKenzie
(74) *Attorney, Agent, or Firm* — Matthew R. Weaver; Aaron M. Pile; Jeffrey A. Sharp

(57) ABSTRACT

The invention resides in a de-aeration device including at least one de-aeration chamber for locating a slurry; at least one slurry inlet connected to the de-aeration chamber to allow the slurry to pass into the de-aeration chamber; at least one slurry outlet to allow slurry to pass out of the de-aeration chamber; and at least one de-aeration face for collecting and transporting air from the slurry.

6 Claims, 7 Drawing Sheets

DE-AERATION DEVICE

FIELD OF THE INVENTION

This invention relates to a de-aeration device. In particular, the invention relates to a de-aeration device for de-aerating slurries particularly used in mineral processing.

BACKGROUND OF THE INVENTION

The classification of particles according to their size and/or weight is often used in mineral processing. In order to classify these particles it is common to locate the particles in a solution to form a slurry. This slurry is then passed through various types of equipment in order to separate the particles into different sizes and/or densities.

A problem using a slurry to classify particles is that air is often formed or entrained within the slurry as the slurry moves through various types of processing equipment in a processing plant. Air bubbles formed within the slurry can cause problems with the movement of the slurry through a processing plant. For example, aeration of the slurry can reduce the efficiency of a pump used for pumping of the slurry through the processing plant. Further, aeration of the slurry can cause cavitation and premature wear of the impellor of a pump. This can lead to higher maintenance costs and premature failure of the pump.

Air bubbles formed within the slurry can also cause complications when trying to classify the particles using classifying equipment. Classifying equipment typically relies on movement of the particles within the slurry based on the size and/or weight of the particles. Air bubbles located within the slurry can effect the desired movement of the particles within the slurry. This is particularly evident in floatation processes as heavy particles can often become attached to air bubbles allowing them to pass upwardly through the classifying equipment when it is desirable for the heavy particles to remain at a bottom of the classifying equipment.

OBJECT OF THE INVENTION

It is an object of the invention to overcome or alleviate one or more of the disadvantages of the above disadvantages or provide the consumer with a useful or commercial choice.

SUMMARY OF THE INVENTION

In one form, although not necessarily the only or broadest form, the invention resides in a de-aeration device including:
  at least one de-aeration chamber for locating a slurry;
  at least one slurry inlet connected to the de-aeration chamber to allow the slurry to pass into the de-aeration chamber;
  at least one slurry outlet to allow slurry to pass out of the de-aeration chamber; and
  at least one de-aeration face for collecting and transporting air from the slurry.

The slurry that is classified may be any mineralised slurry. Normally the slurry is a coal slurry.

The de-aeration device may form part of a classifier or may be stand alone piece of equipment.

The de-aeration device may include an air outlet to allow air to be passed out of the de-aeration chamber.

The de-aeration device may also include a screen located adjacent the slurry outlet to filter oversize particles from the slurry before the slurry passes through the slurry outlet.

The de-aeration device may include may include a hatch to access and/or remove the screen.

In yet another form, the invention resides in a classifier for classifying particles, the classifier including:
  a de-aeration device including:
    at least one de-aeration chamber for locating a slurry;
    at least one slurry inlet connect to the de-aeration chamber to allow the slurry to pass into the de-aeration chamber;
    at least one slurry outlet to allow slurry to pass out of the de-aeration chamber; and
    at least one de-aeration face for collecting and transporting air from the slurry; and
  a classification device used to classify the slurry after it passes out of the de-aeration device.

BRIEF DESCRIPTION OF THE DRAWINGS

An embodiment of the invention will be described within reference to the accompanying drawings in which.

DETAILED DESCRIPTION OF THE PREFERRED EMBODIMENTS

Figure 1:
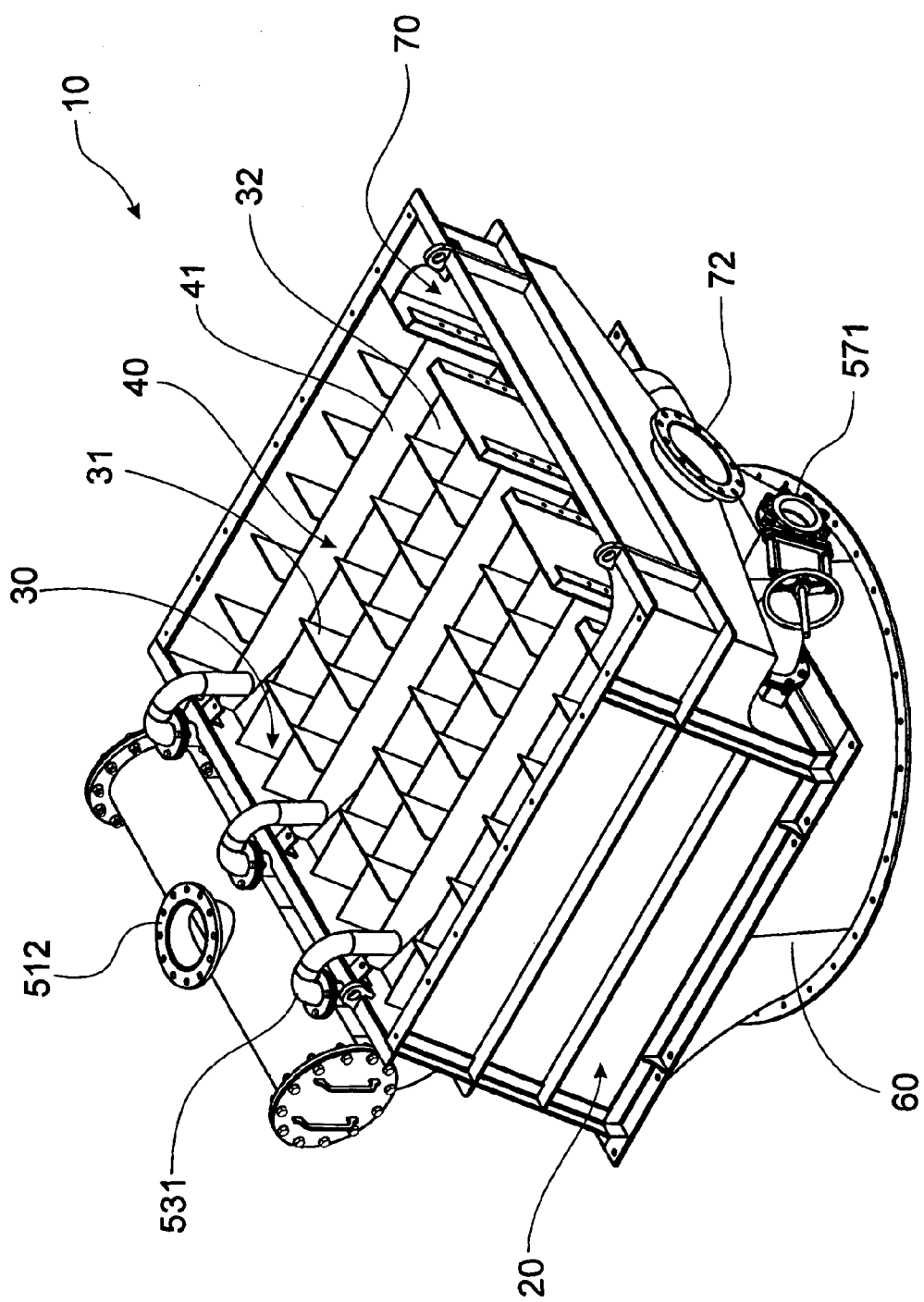
FIG. 1 shows a perspective view of a classification apparatus which includes de-aeration devices according to an embodiment of the invention.
Figure 2:
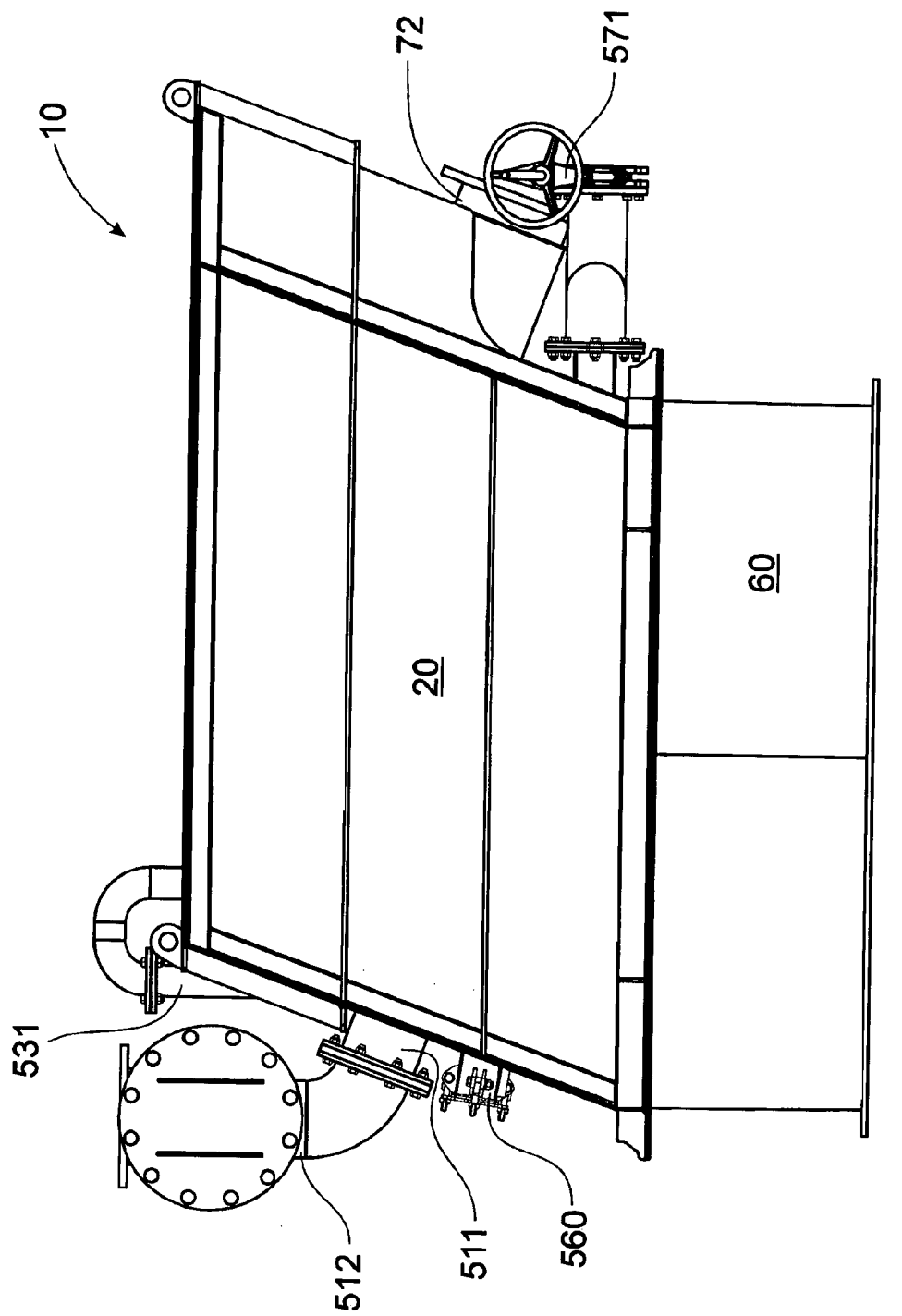
FIG. 2 shows a front view of the classification apparatus according to FIG. 1.
Figure 3:
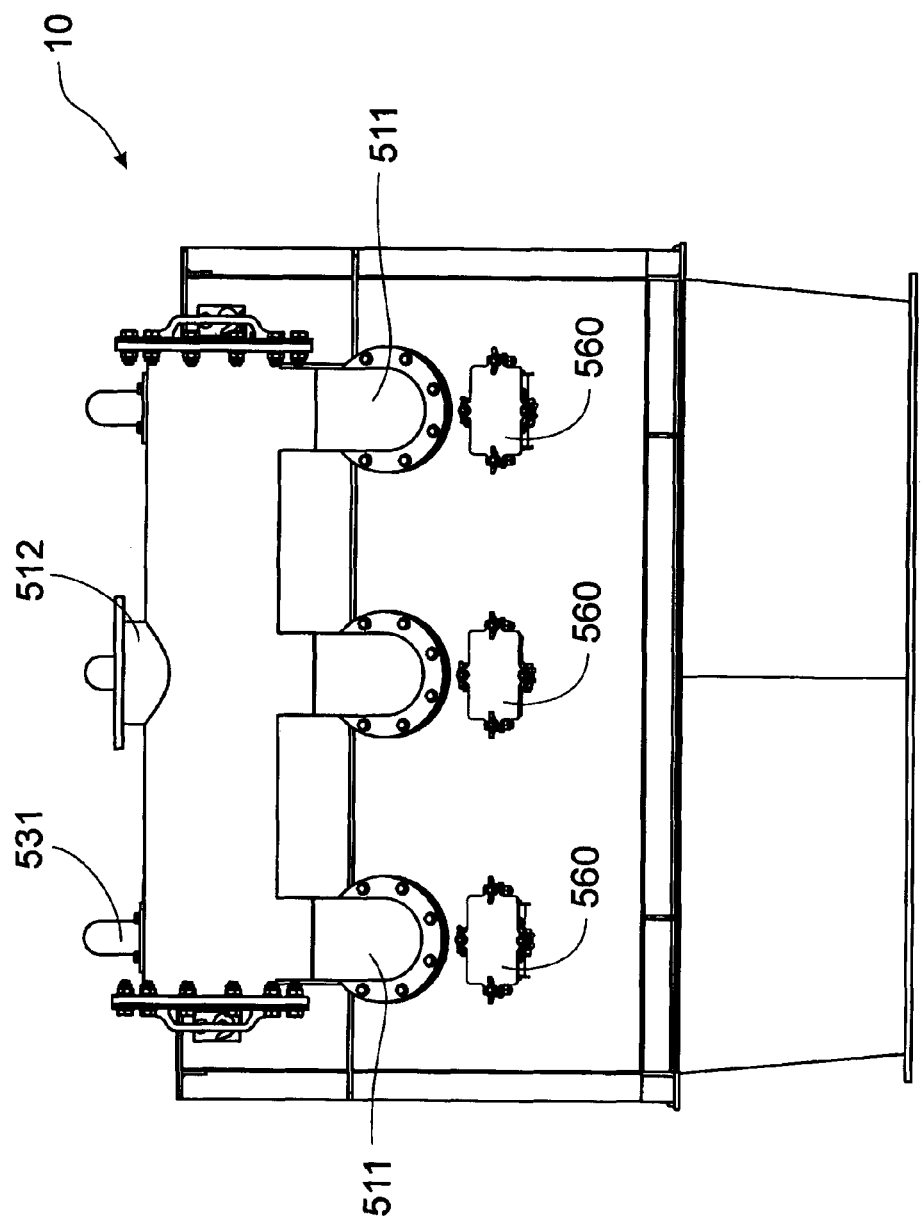
FIG. 3 shows a left side view of the classification apparatus according to FIG. 1.
Figure 4:
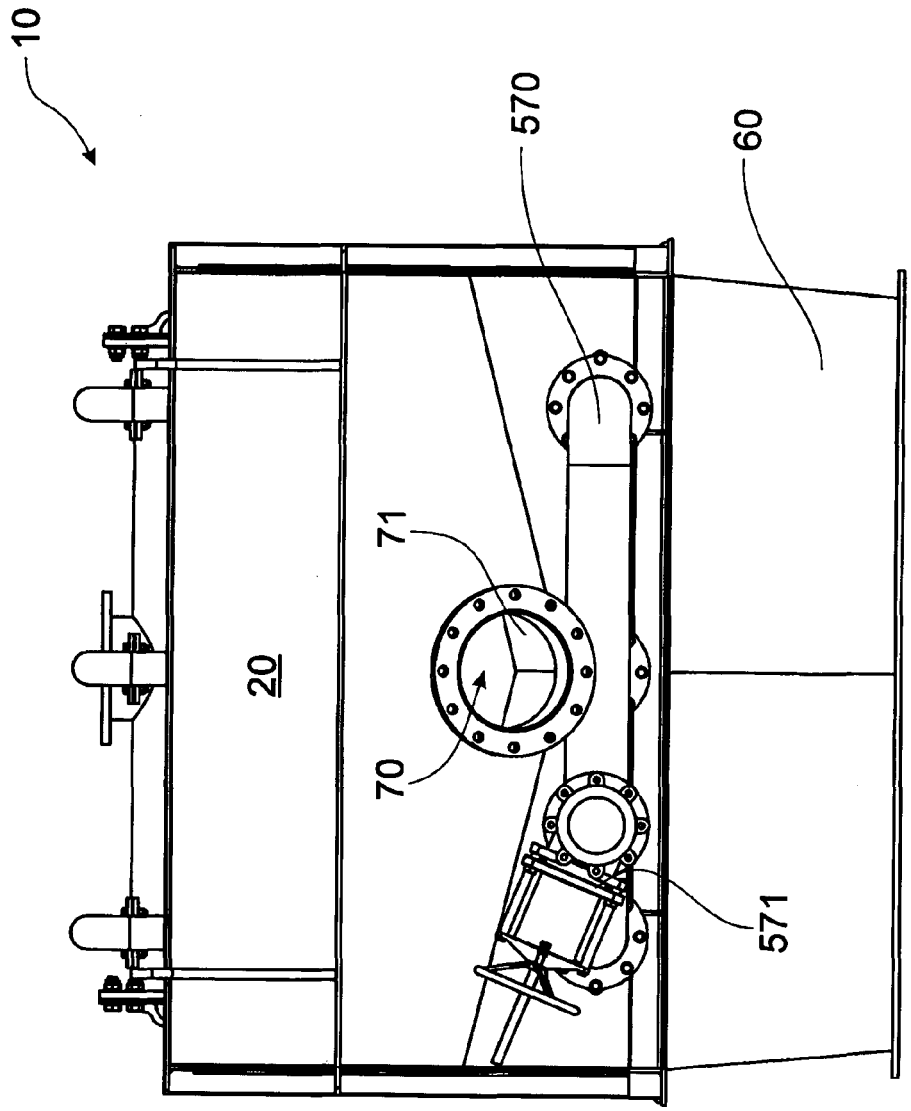
FIG. 4 shows a right side view the classification apparatus according to FIG. 1.
Figure 5:
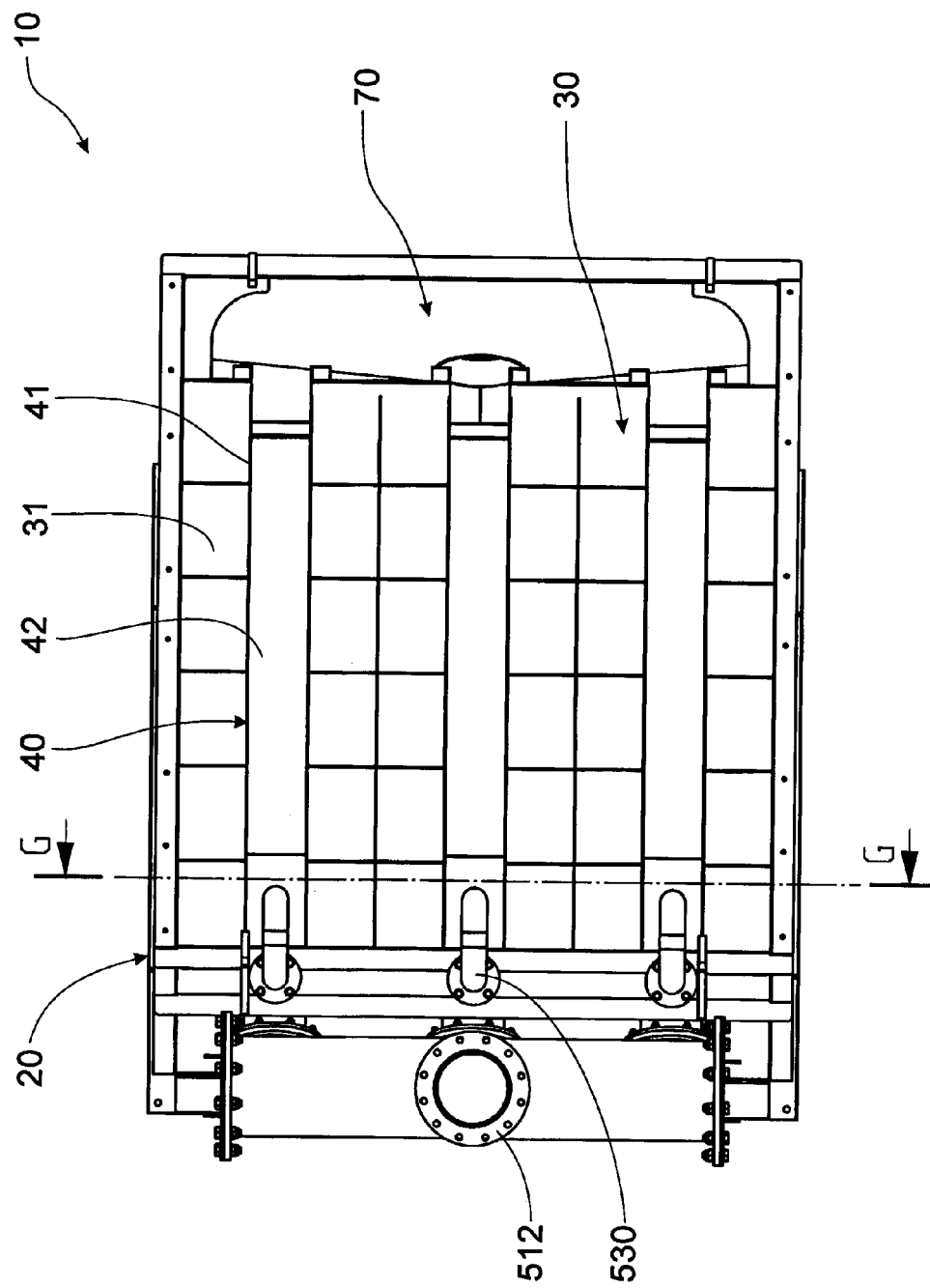
FIG. 5 shows a top view of view of the classification apparatus according to FIG. 1.
Figure 6:
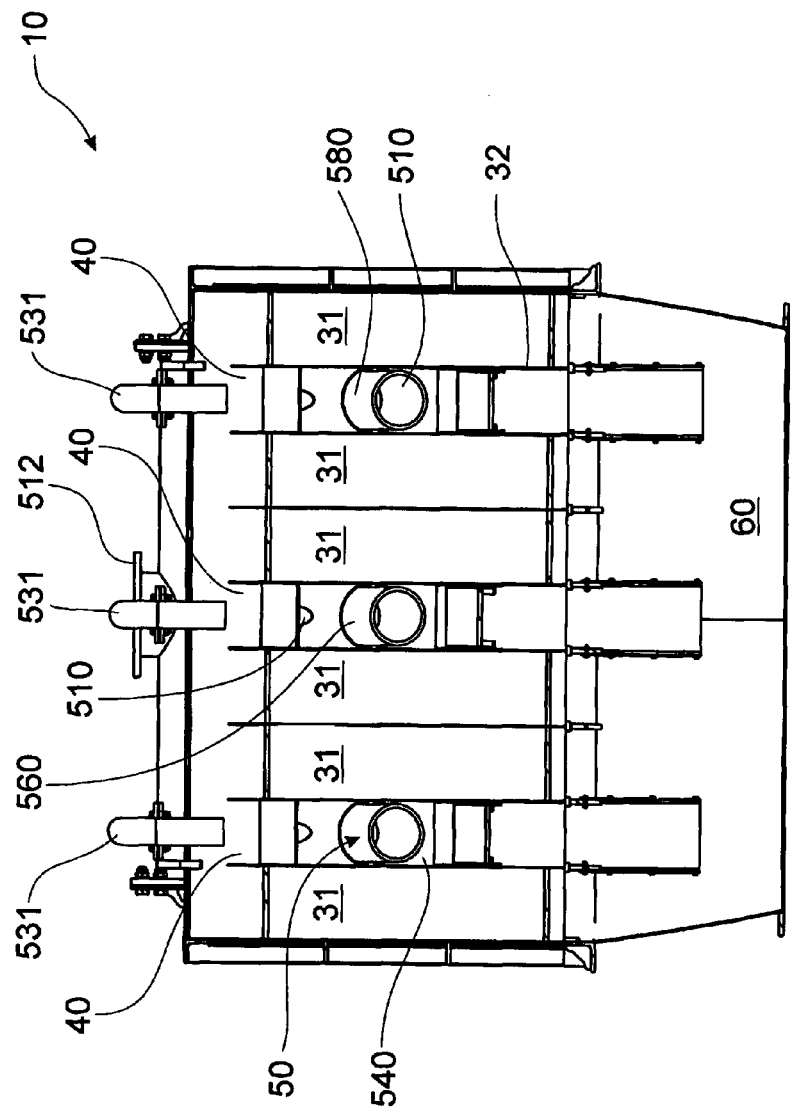
FIG. 6 shows a lateral sectional view of the classification apparatus along the line G-G shown in FIG. 5.
Figure 7:
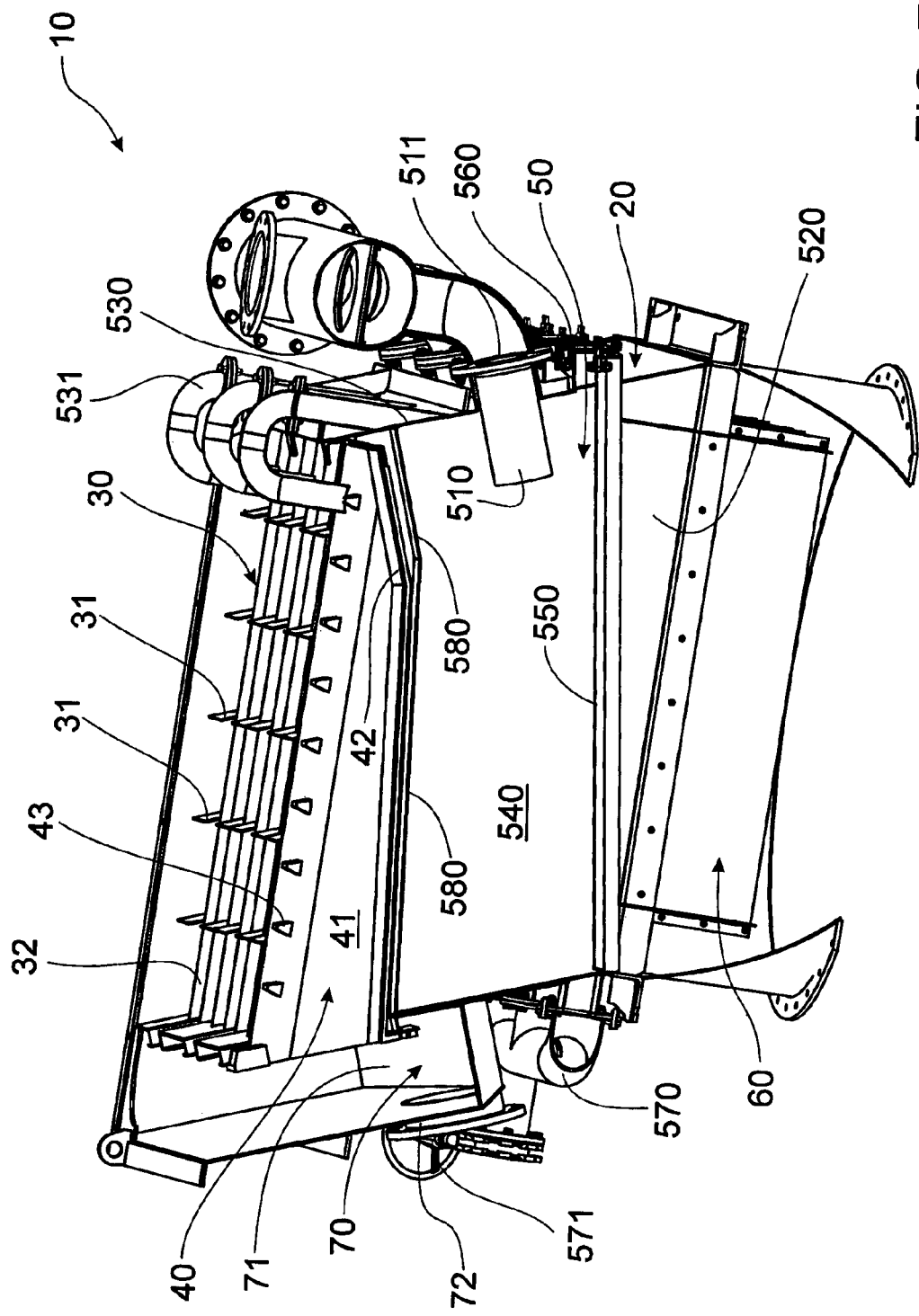
FIG. 7 shows a longitudinal perspective sectional view of the classification apparatus according to FIG. 1.

FIGS. 1 to 7 show a classifier 10 used to separate coal particles, which are located in a coal slurry, on the basis of both size and weight. The classifier 10 includes a housing 20, a series of plate arrays 30, a series of launders 40, a series of de-aeration devices 50 and a reservoir 60.

The housing 20 is used to house the plate arrays 30, launders 40, de-aeration devices 50 and reservoir 60. It should be appreciated that the housing 20 may be shaped and sized differently according to design requirements. It should also be appreciated that a top of the housing 20 is not shown in the FIGS in order to more clearly shown the plate arrays 30 and launders 40.

There are six sets of plate arrays 30. However, it should be appreciated that the number plate arrays 30 may be varied depending on design criteria. Each plate array 30 is made up of a set of spaced apart, parallel inclined plates 31. For clarity, only a minimal number of plates 31 have been illustrated within each plate array 30. It should be appreciated that the number of plates 31, the size of the plates 31, the angle of inclination of the plates 31 and the spacing of the plates 31 can again be varied according to design criteria. Longitudinal members 32 are located on sides of respective sets of plates 30.

Three launders 40 are used to catch the particles located with coal slurry after the coal slurry has passed through the plate arrays 30. Launders 40 are spaced between respective plate arrays 30. For clarity, only a single launder has been illustrated. However, a person skilled in the art would appreciate where the additional launders 40 are located. Further, a person skilled in the art would appreciate number and type of launders 40 may be varied according to design criteria. Each launder 40 is formed from a two side walls 41, an inclined base 42 and a series of cross-members 43.

A collector 70 is formed at the end of the launders 40. The collector 70 is located within the housing 20 to collect the coal slurry once it has passed through the launders 40. The collector 70 is formed by a pair inclined members 71 that are angled toward each other to form a V-shaped valley. A top outlet pipe 72 is connected to the collector 70 at the bottom of the V-shaped valley to transport the slurry for further processing.

There are three de-aeration devices 50 that are used to de-aerate the coal slurry so that the classifier 10 can classify the coal slurry more effectively. Each de-aeration device 50 is located below a respective launder 40 and between respective plate arrays 30. It would be appreciated by a person skilled in the art that the number of de-aeration devices is typically the same as the number of launders 40. However, it would also be appreciated that this need not be the case. Each de-aeration device 50 is formed from a slurry inlet 510, a slurry outlet 520, an air outlet 530 and a de-aeration chamber 540.

The slurry inlet 510 is connected to the de-aeration chamber 540 via an inlet pipe 511 to allow the coal slurry to enter into the de-aeration chamber 540.

The slurry outlet 520 is located adjacent a bottom of the de-aeration chamber 540 to allow the coal slurry to pass into the reservoir 60.

A screen 550 is located adjacent the slurry outlet 520 and covers the slurry outlet 520. The screen 550 is used to assist in preventing oversize particles from being passed into the reservoir 60. The screen 550 is made of wedge wire which extends longitudinally. However, it should be appreciated that the screen 550 may be made from a variety of other materials that a person skilled in the art would appreciate.

Cleaning hatches 560 are located adjacent an end of the screens to allow access to the screens. The screens 550 are removable through respective cleaning hatches in order to clean the screens 550.

Oversize particle outlets 570 are located at the opposite end of the screens to the cleaning hatches. The oversize particle outlets 570 are used to remove oversized particles from a bottom of the de-aeration chamber. An over size particle valve 571 may be opened to remove the over size particles through the oversize particle outlet 570.

A top of each of the de-aeration chambers 50 are inclined and are formed by the inclined bases 42 of the respective launders 40. The bottom of the inclined bases form a inclined de-aeration face 580. An air outlet 530 is located adjacent an end of the inclined base 42 (and accordingly the de-aeration faces 580) at the top of the de-aeration chamber 50. An air pipe 531 is connected to the air outlet 530. It should be appreciated that the tops of the de-aeration chambers 50 need not be formed from the inclined bases of the respective launders 40 and may be formed irrespective of the launders 40. That is, the de-aeration faces 580 may be formed by other means.

The reservoir 60 is formed in the bottom of the housing 20 and is used to receive the coal slurry after it passes through the de-aeration devices 50. Accordingly, the reservoir 60 is located below the de-aeration chambers 510. The reservoir 60 is also located below the plate arrays 30 and is used to deliver the coal slurry to the plate arrays 30. The longitudinal members 32 of which abut the plates 31 extend into the reservoir 60.

In use, the coal slurry is passed through a central pipe 512 which divides into the three inlet pipes 511. The coal slurry is passed through the slurry inlets 510 into respective de-aeration chambers 540. The coal slurry then passes through respective screens 550 which remove oversize particles from the slurry. The slurry then passes out of the slurry outlet 520 and into the reservoir 60 located at the bottom of the housing 20. The slurry then passes upwardly through the plate arrays 30 where particles located within the coal slurry are sorted according to size and weight. The heavy and large particles pass into the bottom of the reservoir 60 where they are removed using a reservoir 60 outlet (not shown). The lighter and smaller particles are able to pass through the plates 31 of the plate arrays 30 where they pass into launders 40, into the collector 70 and out of the top outlet pipe 72.

When the coal slurry is located within the de-aeration chambers 540, air bubbles located within the coal slurry pass upwardly through the coal slurry. The air bubbles move upwardly until they contact respective inclined de-aeration faces 580 which are formed by the inclined bases 42 of the respective launders 40. The air located within the bubbles travels along the de-aeration faces 580 due to the inclination of the de-aeration faces 580 until the air passes through the air outlets 530 and into the air pipes 531. The air is then vented back into the launders 40. However, the air may be vented into the atmosphere.

The removal of air from the slurry provides a number of benefits including a better separation of the particles when the slurry moves through the plate arrays 30 and a likely increased throughput.

It should be appreciated that various other changes and modifications may be made to the embodiment described without departing from the spirit or scope of the invention.

The invention claimed is:

1. A classifier comprising a housing further comprising:
   at least one de-aeration chamber for locating a slurry;
   at least one slurry inlet connected to the de-aeration chamber to allow the slurry to pass into the de-aeration chamber;
   a screen located at least partially beneath the de-aeration chamber to filter oversize particles from the slurry;
   at least one plate array for receiving the slurry and sorting particles into at least a first set of particles and a second set of particles once the slurry passes through the de-aeration chamber;
   a reservoir located at least partially beneath the screen for receiving the slurry and the second set of particles;
   at least one launder arranged at least partially above the de-aeration chamber for receiving the slurry and the first set of particles once the slurry has passed out of or through the at least one plate array; and
   a collector for collecting the first set of particles.

2. The classifier of claim 1 further comprising an air outlet to allow air to be passed out of the de-aeration chamber.

3. The classifier of claim 1 further comprising a hatch to access the screen.

4. The classifier of claim 1 further comprising a hatch to remove the screen.

5. The classifier of claim 1 further comprising at least one inclined de-aeration face for collecting and transporting air from the slurry.

6. The classifier of claim 5 wherein an inclined base of the launder forms the inclined de-aeration face.

* * * * *